(12) United States Patent
Barbeau et al.

(10) Patent No.: US 8,501,867 B2
(45) Date of Patent: Aug. 6, 2013

(54) MIXTURE BASED ON A POLYISOCYANATE AND A SOLVENT OF ETHER ESTER TYPE, AQUEOUS EMULSION OBTAINED FROM THIS MIXTURE AND USE OF THIS EMULSION FOR THE MANUFACTURE OF COATINGS AND ADHESIVES

(75) Inventors: Philippe Barbeau, Genas (FR); Philippe Olier, Lyons (FR); Johannes Schwarz, Lyons (FR)

(73) Assignee: Vencorex France, Saint-Preist (FR)

( * ) Notice: Subject to any disclaimer, the term of this patent is extended or adjusted under 35 U.S.C. 154(b) by 666 days.

(21) Appl. No.: 12/598,632

(22) PCT Filed: Apr. 29, 2008

(86) PCT No.: PCT/FR2008/050770
§ 371 (c)(1), (2), (4) Date: Dec. 16, 2009

(87) PCT Pub. No.: WO2008/145932
PCT Pub. Date: Dec. 4, 2008

(65) Prior Publication Data
US 2010/0137483 A1    Jun. 3, 2010

(30) Foreign Application Priority Data
May 3, 2007 (FR) ..................................... 07 03190

(51) Int. Cl.
| | |
|---|---|
| *B05D 3/02* | (2006.01) |
| *B32B 27/00* | (2006.01) |
| *B32B 27/40* | (2006.01) |
| *C08G 18/08* | (2006.01) |
| *C08G 18/28* | (2006.01) |
| *C08J 3/00* | (2006.01) |

(52) U.S. Cl.
USPC ...................... 524/591; 427/372.2; 427/385.5; 428/423.1; 524/317; 524/589; 524/590; 524/839; 524/840

(58) Field of Classification Search
USPC ................. 524/317, 589, 590, 591, 839, 840; 428/423.1; 427/372.2, 385.5
See application file for complete search history.

(56) References Cited

U.S. PATENT DOCUMENTS

| | | | | |
|---|---|---|---|---|
| 4,230,809 | A | * | 10/1980 | Heinrich et al. ................ 521/65 |
| 5,556,935 | A | | 9/1996 | Traubel et al. |
| 6,528,610 | B1 | * | 3/2003 | Frouin et al. .................... 528/85 |
| 2003/0158328 | A1 | * | 8/2003 | Nabavi et al. ................. 524/589 |

FOREIGN PATENT DOCUMENTS

| | | |
|---|---|---|
| WO | 97/31960 | 9/1997 |
| WO | 2006/064035 | 6/2006 |

* cited by examiner

*Primary Examiner* — Patrick Niland
(74) *Attorney, Agent, or Firm* — Michael B. Fein; Eckert Seamans Cherin & Mellott

(57) ABSTRACT

The mixture of the invention comprises at least one cycloaliphatic polyisocyanate and at least one solvent comprising an ester function and an ether function. An aqueous emulsion can be obtained from this mixture which also comprises a compound bearing a function with a mobile hydrogen, selected from primary or secondary hydroxyl functions, phenol functions, primary and/or secondary amino functions, carboxylic functions and a thiol function or a compound containing precursor functions capable of freeing hydroxyl functions. The emulsion can be used for the manufacture of coatings on a substrate of cement, of wood or especially of leather, and also for the manufacture of adhesives.

15 Claims, No Drawings

MIXTURE BASED ON A POLYISOCYANATE AND A SOLVENT OF ETHER ESTER TYPE, AQUEOUS EMULSION OBTAINED FROM THIS MIXTURE AND USE OF THIS EMULSION FOR THE MANUFACTURE OF COATINGS AND ADHESIVES

CROSS-REFERENCE TO RELATED APPLICATIONS

The present application is a 35 U.S.C. 371 National Stage Application of International Application No. PCT/FR2008/050770, International Filing Date: Apr. 29, 2008, which claims priority under 35 U.S.C. §119(a) to France Application No. 07 03190, filed May 3, 2007, each of which is incorporated herein by reference in its entirety.

The present invention concerns a mixture based on a polyisocyanate and a solvent of the ether ester type, an aqueous emulsion obtained from this mixture and the use of this emulsion for the manufacture of coatings and adhesives.

It is known that in the field of paints and varnishes diisocyanates are widely used, in particular alkylene diisocyanates and their derivatives of the biuret type or their trimers.

Until recently, these products were generally used in solution in organic solvents. However, the use of organic solvents is more and more often criticized because these solvents, or at least some of them, are reputed to be toxic or chronotoxic. It is for this reason that endeavours have been made increasingly to develop techniques which utilize only a little solvent or which are even devoid of solvent. It is with this aim that compositions based on polyisocyanate which are both easily emulsifiable and easily usable in emulsion in water have been perfected. The water serves in this case as a carrier for the components of the formulation and make it possible to reduce the organic solvent content thereof. In addition, such compositions allow the equipment used for their application to be rinsed with water.

One of the problems linked to this type of technique is that of obtaining emulsions which have good stability, i.e. in fact emulsions in which the size of the particles in suspension in the liquid phase is as fine as possible. Moreover, it is of course required that the coatings obtained using these emulsions have, at least overall, properties comparable with those of the coatings obtained from compositions in organic solvent. This may be the case in particular with regard to the appearance, and more particularly the brilliance, water-resistance, or the speed of drying of the coating.

The object of the invention is therefore to perfect a polyisocyanate composition capable of responding to these problems.

To this end, the invention concerns a mixture based on polyisocyanate(s), characterized in that it comprises:
   at least one cycloaliphatic polyisocyanate;
   at least one solvent comprising an ester function and an ether function; and
   optionally a hydrophilic additive.

According to a particular embodiment, the above-mentioned mixture according to the invention is characterized in that it does not comprise any compound comprising a thiol function.

The invention also concerns an aqueous emulsion which is characterized in that it is obtained by emulsification in water of the mixture as described above, which mixture comprises at least one cycloaliphatic polyisocyanate and at least one solvent comprising an ester function and an ether function, optionally with a hydrophilic additive, the emulsion additionally comprising at least one compound bearing at least one function with a mobile hydrogen, selected from primary or secondary hydroxyl functions, phenols, primary and/or secondary amino functions, carboxylic functions and a thiol function or a compound containing precursor functions capable of freeing hydroxyl functions.

It has very surprisingly been discovered that, by means of the mixture according to the present invention used as a hardener for aqueous coatings, it is possible to obtain coatings resistant to chemical attack, having increased brilliance and, in addition, to reduce the drying time of said aqueous coatings.

Other features, details and advantages of the invention will become clearer from the following description, and also various specific but non-limiting examples intended to illustrate it.

As indicated above, the mixture based on polyisocyanate(s) of the invention comprises two essential elements: a cycloaliphatic polyisocyanate and a specific solvent. These two elements will be described more precisely hereinafter.

In the present invention, by "cycloaliphatic polyisocyanate" there is to be understood a polyisocyanate comprising at least one aliphatic cycle. The compounds particularly preferred are oligomers or oligocondensates of cycloaliphatic monomers, i.e. in which the skeleton includes at least one aliphatic cycle; among these products, those which are particularly preferred are those which come from the homo- or hetero-trimerization of a cycloaliphatic monomer.

The cycloaliphatic monomers are advantageously selected from the following list:
   cyclobutane-1,3-diisocyanate,
   cyclohexane-1,3 and/or 1,4-diisocyanate,
   1-isocyanato-3,3,5-trimethyl-5-isocyanato methylcyclohexane (isophorone diisocyanate, IPDI),
   perhydro 2,4' and/or 4,4'-diphenylmethane diisocyanate ($H_{12}$MDI), and in general amino aromatic precursors or perhydrogenated carbamates,
   bis-isocyanatomethylcyclohexanes (in particular 1,3 and 1,4) (BIC), and
   bis-isocyanatomethylnorbornane (NBDI).

These monomers are preferably such that at least one isocyanate function, and advantageously both isocyanate functions, are distant from the nearest ring by at most one carbon and are preferably connected directly thereto. In addition, these cycloaliphatic monomers advantageously have at least one, and preferably two, isocyanate function(s), selected from the secondary, tertiary or neopentyl isocyanate functions.

The best results, in particular in terms of drying time of aqueous coatings or adhesives in which the hardener comprises a mixture according to the present invention, are obtained when the conformational freedom of the cycloaliphatic monomer is low. As monomers capable of giving good results, it is possible to cite by way of example, and even paradigm, the following monomers:
   compounds corresponding to the hydrogenation of the aromatic nucleus or nuclei bearing isocyanate functions of monomers of aromatic isocyanates and in particular of TDI (toluene diisocyanate) and diisocyanato-biphenyls, the compound known under the letter symbol $H_{12}$MDI (4,4'-dicyclohexylmethanediyl diisocyanate) and the various BICs [bis(isocyanato-methylcyclohexane)];
   and especially
   norbornane diisocyanate (or 2,5(6)-diisocyanato-methylbicyclo[2,2,1]heptane) often called by its letter symbol NBDI; and
   isophoronediisocyanate or IPDI or 1-isocyanato-3,3,5-trimethyl-5-diisocyanatomethylcyclohexane.

Advantageously, the cycloaliphatic polyisocyanate of the invention is an isocyanurate polyisocyanate obtained from cycloaliphatic diisocyanates, preferably IPDT, NBDT, $H_{12}$MDT or 1,3-BDT (1,3-BIC trimer). The isocyanurate polyisocyanate is preferably obtained by catalytic (cyclo) trimerization of cycloaliphatic diisocyanates.

According to a particular embodiment of the invention, the cycloaliphatic polyisocyanate is the product of homocondensation of isocyanate IPDI or comes from a mixture of the products of homocondensation, of addition, of the isocyanates HDI and IPDI.

Preferably, the cycloaliphatic polyisocyanate is the product of homocondensation of the isocyanate IPDI alone, which is preferably cyclotrimerized into isocyanurate of IPDI, referred to hereinafter as IPDT.

One, two or more other polyisocyanates may form part of the mixture according to the present invention. The polyisocyanate(s) may be selected from any polyisocyanate known in the field, and in particular from the products of homocondensation or heterocondensation of alkylenediisocyanates, comprising in particular products of the "biuret" type and of the "(cyclo)trimer" type, even "prepolymers" with isocyanate function, optionally including urea, urethane, allophanate, and/or ester amide functions, and from mixtures containing them.

They may, for example, be polyisocyanates marketed by the company Rhodia, under the name "Tolonate®".

Generally, the polyisocyanates preferred are the products of homocondensation or heterocondensation of the following monomer isocyanates:
1,6-hexamethylene diisocyanate (HDI), in particular in the isocyanurate form (HDT);
1,12-dodecane diisocyanate;
cyclobutane 1,3-diisocyanate;
cyclohexane 1,3 and/or 1,4-diisocyanate;
1-isocyanato-3,3,5-trimethyl-5-diisocyanato-methylcyclohexane (isophorone diisocyanate, or IPDI);
2,4 and/or 2,6-hexahydrotolylene diisocyanate;
hexahydro 1,3- and/or 1,4-phenylene diisocyanate;
perhydro 2,4'- and/or 4,4-diphenylmethane diisocyanate;
1,3- and/or 1,4-phenylene diisocyanate;
2,4- and/or 2,6-tolylene diisocyanate;
diphenylmethane 2,4'- and/or 4,4'-diisocyanate;
isocyanato (4)-methyloctylene, diisocyanate (LTI or NTI);
triphenylmethane 4,4',4"-triisocyanate;
1,3-bis-isocyanatomethyl cyclohexane;
bis-isocyanatomethylnorbornane (NBDI);
2-methyl-pentamethylene diisocyanate.

As other monomers, it is also possible to cite the aromatic monomers, such as, for example, 2,4-toluene diisocyanate (TDI), 2,6,4,4'-diphenylmethane diisocyanate (MDI), 1,5-naphthalene diisocyanate (NDI), tolidine diisocyanate (TODI) and para-phenylene diisocyanate (PPDI), as well as the monomers corresponding to the hydrogenation products of the aforementioned aromatic monomers.

As indicated previously, the other essential element of the mixture based on polyisocyanate of the invention is the solvent. The aliphatic polyisocyanates used in the mixture of the present invention, and in particular when they comprise polyisocyanurate-type derivatives of cycloaliphatic diisocyanate, are as a general rule products with high viscosity at ambient temperature, and may even be in the form of vitreous and amorphous solids which it is necessary to "dilute", or even "dissolve" in the organic phase in order to be able to utilize them.

This dilution may be obtained by means of solvents which must be judiciously selected according to their physico-chemical character, their solvent power, and also their effect on the properties in the applications in the aqueous phase. In particular, the solvent should be sufficiently hydrophobic to "solubilize" (or "dilute") the cycloaliphatic polyisocyanate, but must also be compatible with the aqueous emulsions for which the mixture of the invention is intended.

In addition, among the important criteria for the selection of a solvent suitable for applications in the aqueous phase may be cited the characteristics of non-inflammability and of absence of odour or low odour of said solvent. For the solvents conventionally used in the systems for coatings and adhesives in the solvent phase have unacceptable characteristics of inflammability and of unsuitable odour in the aqueous phase.

The research which has led to the present invention has made it possible to determine that the solvents comprising both an ester function and an ether function may fulfil the various requirements mentioned above.

Advantageously, the solvent used in the mixture of the invention is selected from the following solvents: 1-methoxy-2-propylacetate, 3-methoxy-n-butylacetate, diethylene glycol butyl ether acetate, butylethylene glycol acetate and ethyl ethoxyproprionate.

Preferably, the solvent is 3-methoxy-n-butylacetate.

In addition, the solvent(s) used in the mixture of the invention has/have the advantage of imparting to said mixture a suitable viscosity according to the type of application desired. In particular, it was observed that the mixtures according to the invention have viscosities at 5° C. of less than 10000 mPa·s, even for mixtures including a relatively small quantity of solvent, of the order of 35% by weight in relation to the total mass of the mixture.

Thus, the solvent(s) used in the mixture of the present invention allow(s) easy utilisation with a polyisocyanate, at a low temperature, and with a small quantity of solvent(s) used, compared with the solvents customarily used in the paint field, such as, for example, solvents of the butyl acetate type and others.

Moreover, the advantages of the solvent of the invention are in particular its low odour and its non-inflammability. The term "non-inflammability" means that the flash point of the solvent is above 61° C., measured according to standard DIN 517-55. Thus, for example, 3-methoxy-n-butylacetate has a flash point of 62° C.

The invention of course covers the case where the mixture contains a plurality of solvents. The solvents may be a mixture of solvents according to the invention. This may also be a combination of a solvent or of a mixture of solvents according to the invention with one or more other known solvents used for this type of mixture, for example butyl acetate, esters of carboxylic acid, such as propylene carbonate, lactones such as ϵ-caprolactone, and N-ethylpyrrolidone. However, the solvents will preferably be selected from those which are non-inflammable, non-toxic (to man and the environment) and have a low odour (for reasons of nuisance and unpleasantness for the operators during application).

A solvent is preferably used which has a boiling point between 50° C. and 350° C., more particularly between 100° C. and 300° C. For solvents having a boiling point above 300° C., or even 350° C., result in coatings and adhesives in which the drying time will be very, or even, too long for the applications envisaged.

The proportion of solvent in the mixture of the invention is generally between 2% and 60%, more particularly between 5% and 50% and even more particularly between 7% and 40% by mass of solvent in relation to the whole of the mixture.

It will be noted that in the case of a mixture of one or more solvents according to the invention with one or more of the known solvents mentioned above, the proportion of solvent according to the invention is preferably at least 30% by mass in relation to the whole of the solvents, the overall proportion in the whole of the solvents then remaining within the range given in the previous paragraph.

The mixture of the invention is advantageously "emulsifiable in water". By a mixture "emulsifiable in water" there is to be understood a mixture which, when it is placed in water, is capable of providing an emulsion, i.e. a liquid medium formed of particles (droplets) of liquid dispersed in another liquid phase.

Preferably, the mixture is of the self-emulsifiable type, i.e., it is a mixture capable, in the presence of a liquid medium in which said mixture is immiscible, of forming an emulsion by a spontaneous mechanism. In the spontaneous emulsification mechanism, the energy required to form an emulsion concerns solely the energy required to redistribute the substance to be emulsified in the mixture: thus there is no need for external energy, fundamentally agitation energy, in order to create the emulsion. In other words, simple manual agitation suffices to effect macroscopically uniform distribution of the discontinuous phase and thus to obtain the emulsion.

So that the mixture of the invention is emulsifiable within the meaning given above, it generally additionally includes an additive allowing it to be emulsified in water, or to render it hydrodispersable or hydrosoluble. The additive is generally a hydrophilic additive, of the surfactant type, and it includes in its structure at least one hydrophilic function. In the continuation of the description, the term "hydrophilic additive" will be used.

A number of variants may therefore be envisaged.

According to a first variant, the mixture contains a hydrophilic additive of the non-reactive type, i.e. the additive is present in admixture with the mixture of the invention without there having been a reaction between the additive and the polyisocyanate of the mixture.

In this first variant, the additive may nevertheless react in an undesirable manner with the other components present in the mixture. The hydrophilic additive is, however, considered to be in a substantially free form in the mixture of the invention. In this context, the expression "substantially free form" means that less than 30%, and advantageously less than 20%, preferably less than 10%, even more preferably less than 5%, or even less than 2% by mass of the hydrophilic additive is in the bonded form, although it has been incorporated in the form of a mixture, without wishing to cause it to react with the other component(s) of the mixture.

As the non-reactive hydrophilic additive, there may be mentioned those described in the documents WO 97/31960 and FR 2855768-A1, the teaching of which may be referred to. These additives have an anionic function and advantageously a fragment of polyethylene glycol chain of at least one, and preferably of at least 5 ethylenyloxy units.

Among these additives, more particular mention may be made of the those of formula (1) below:

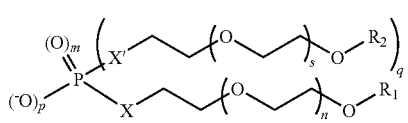

(1)

with, when q is equal to zero, those of formula (2):

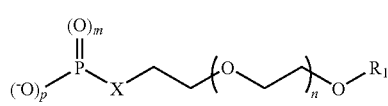

(2)

additives of formula (1) or formula (2) where:
p represents zero or an integer between 1 and 2 (closed intervals, i.e. including the bounds);
m represents zero or an integer between 1 and 2 (closed intervals, i.e. including the bounds);
the sum p+m+q is at most equal to three;
the sum 1+p+2m+q is equal to three or five;
X and X', similar or different, represent an arm having at least two carbon groups;
n and s, similar or different, represent an integer selected between 5 and 30, advantageously between 5 and 25, preferably between 9 and 20 (closed intervals, i.e. including the bounds); and
$R_1$ and $R_2$, identical or different, represent a hydrocarbon radical, advantageously selected from aryls and alkyls, optionally substituted, in particular by a halogen atom, especially fluorine.

The counter-cation is advantageously monovalent and is selected from inorganic cations and organic cations which are advantageously non-nucleophilic and of a quaternary or tertiary nature, in particular the "oniums" of column V such as phosphonium, ammonium, or of column VI such as sulphonium, and mixtures thereof. Counter-cations of the ammonium type, coming from an amine, advantageously of the tertiary kind, are preferred. It is also preferred to avoid the organic cation having a hydrogen reactive with the isocyanate function. The periodic classification of the elements used in the present application is that of the supplement to the Bulletin of the French Chemical Society (Bulletin de la Société Chimique de France), January 1966, No. 1.

Thus, particularly preferred non-reactive hydrophilic additives are the additives known under the name "Rhodafac®" of the company Rhodia which are generally used in their neutralized form, said neutralization being able to be carried out before or during, preferably before, the addition of the additive to the mixture. Neutralization may in particular be effected by means of amines, as indicated above, in particular by dimethylcyclohexylamine or DMCHA.

According to a second variant, the mixture contains a hydrophilic additive of the reactive type, i.e. the additive is present in the mixture but being grafted onto the polyisocyanate of the mixture. As additives that can be grafted onto polyisocyanates, it is possible to cite the hydrophilic additives mentioned in U.S. Pat. No. 4,663,377, the teaching of which may be referred to.

As other graftable additives it is also possible to cite those of the non-ionic or ionic (cationic or anionic) type such as those mentioned in EP-A-0703255 (the teaching of which may be referred to), additives comprising —$SO_3H$ or —$SO_3$— groups. The additives grafted onto the polyisocyanate of the mixture according to the present invention are not however preferred.

Finally, according to a third variant, it is possible to combine the two preceding variants, i.e. the mixture contains both a non-reactive hydrophilic additive and a grafted hydrophilic additive.

The mass ratio between the polyisocyanate(s) of the mixture and the hydrophilic additive is most often at most equal to around 33%, and advantageously at most equal to around 20%, preferably to around 12%. This mass ratio is advantageously greater than 1%, preferably than 2%.

The hydrophilic additive may be introduced into a mixture comprising the cycloaliphatic polyisocyanate(s) and the solvent of the invention. The hydrophilic additive may be added by simply mixing the additive with the cycloaliphatic polyisocyanate(s) in solution in the solvent.

In the case of a hydrophilic additive of the reactive type, mixing may take place more particularly at a temperature between, for example, 50° C. and 130° C., according to the type of additive.

On the other hand, in the case of a hydrophilic additive of the non-reactive type, in particular for phosphate-based hydrophilic additives, mixing should not be carried out at too high a temperature, and is generally carried out at a temperature varying from 10° C. to less than 100° C., preferably at a temperature of between 10° C. and 90° C., and more preferably between 10° C. and 80° C., for example at around 50° C.

In this regard, it is desirable to incorporate the non-reactive hydrophilic additive in a mixture which is the least viscous possible, which is made possible by means of the solvent described above.

Quite particularly preferred are the mixtures of the invention which comprise:
  a solvent with ether and ester function of the alkoxy-alkyl carboxylate type, preferably 3-methoxy-n-butylacetate; and
  a cycloaliphatic polyisocyanate, preferably isophorone diisocyanate isocyanurate (IPDT),
in proportions of 20% to 50% by weight of solvent in relation to the total mass of mixture, preferably 25% to 45%, for example 35% by weight of solvent in relation to the total mass of mixture.

According to one variant, quite particularly preferred are the mixtures of the invention which consist of a mixture of:
  a solvent with ether and ester function of the alkoxy-alkyl carboxylate type, preferably 3-methoxy-n-butylacetate; and
  a cycloaliphatic polyisocyanate, preferably isophorone diisocyanate isocyanurate (IPDT)
in proportions of 20% to 50% by weight of solvent in relation to the total mass of mixture, preferably 25% to 45%, for example 35% by weight of solvent in relation to the total mass of mixture.

According to another variant, mixtures of the invention are preferred which comprise:
  a solvent with ether and ester function of the alkoxy-alkyl carboxylate type, preferably 3-methoxy-n-butylacetate;
  a cycloaliphatic polyisocyanate, preferably isophorone diisocyanate isocyanurate (IPDT); and
  a non-reactive hydrophilic additive, preferably an additive of formula (1) and/or formula (2) defined previously,
  in proportions of 20% to 50% by weight of solvent in relation to the total mass of mixture, preferably 25% to 45%, for example 35% by weight of solvent in relation to the total mass of mixture, and with a mass ratio between the hydrophilic additive and the polyisocyanate(s) of the mixture equal at most to around 33%, advantageously equal at most to around 20%, preferably around 10%, and advantageously greater than 1%, preferably than 2%.

Among the mixtures which have just been defined, said mixtures are also preferred which comprise in addition one or more other polyisocyanates, and in particular those which comprise an isocyanurate of an aliphatic polyisocyanate, in particular hexamethylene diisocyanate isocyanurate (HDT).

The mixture of the present invention may in addition contain one or more organic or inorganic additives, such as those commonly used in the field, and for example selected from stabilizers, antioxidants, pigments, rheological additives, thickeners, surfactants, and catalysts, according to the properties desired.

The mixture according to the present invention is thus generally, and most often, in the form of a homogeneous and slightly viscous liquid, in particular having a viscosity below 10000 mPa·s at a temperature of 5° C., and in particular below 2000 mPa·s at 25° C. (for a solvent content of 35% by weight).

The mixture of the invention may be utilized with one or more aqueous dispersions of polyurethane. Aqueous dispersions suitable within the scope of the invention are known per se and are described, for example, in the documents U.S. Pat. No. 3,479,310, GB 1076688, U.S. Pat. No. 4,108,814, U.S. Pat. No. 4,092,286, DE 2651505, U.S. Pat. No. 4,190,566, DE 2732131, DE 2811148, or in the documents US 2006/240264, US 2005/288431, US 2005/209425, U.S. Pat. No. 7,012,115 or EP 986592.

As seen above, the invention also concerns an aqueous emulsion obtained starting from the mixture comprising a cycloaliphatic polyisocyanate and the solvent, such as were described previously.

The aqueous phase of the emulsion serves as a vector of the co-reagents polycondensable with the polyisocyanate(s) of the mixture, i.e. the compound or compounds with a mobile hydrogen mentioned previously.

The compounds with a mobile hydrogen that are usable are well known. Preferably, these compounds are selected from polyalcohols which can be used alone or in admixture or compounds containing precursor functions capable of freeing hydroxyl functions. These may advantageously be acrylic polymers, polyesters, polyurethanes or hybrids of these polymers. Polyethers may also be mentioned.

As precursor functions capable of freeing hydroxyl functions, it is possible to cite, for example, epoxy functions, carbonate functions or dioxolane functions. These precursor functions free the hydroxy functions by reaction with a suitable nucleophile such as an amine or water, optionally in the presence of a catalyst which may be an acid compound or a Lewis acid in an amount by weight which may be between, for example, 50 ppm and 5000 ppm, more particularly between 100 ppm and 500 ppm, an amount expressed by weight of catalyst in relation to the dry extract of the polyisocyanate composition and of the compound bearing at least one function with a mobile hydrogen.

The emulsion may of course include one or more (i.e. a mixture of) compounds with mobile hydrogen, with, if necessary and if it is desired for the applications envisaged, one or more aqueous dispersions of polyurethane described above.

The emulsion may in addition contain one or more organic or inorganic additives, such as those commonly used in the field, and for example selected from stabilizers, antioxidants, pigments, rheological additives, thickeners, surface agents and catalysts, according to the properties desired.

The invention also concerns a method for the manufacture of a coating on a substrate in which the emulsion described above is used. By coating, there is to be understood any type of layer applied as a whole or in part on a substrate of a nature to protect and/or to decorate it, for example a paint or a varnish.

The method is employed by applying the emulsion to the substrate by any known technique. The substrate is a material which may be selected from wood, metals, cements, plastics materials, textiles and leather.

In the case of a metallic substrate, the metal may for example be aluminium or a steel.

It will be noted that the method applies to substrates which may have a plurality of superposed coatings and, in this case, the product of the invention may be used for the preparation of any one of these coatings. However, the product of the invention may advantageously be used for a finishing coating, and this is the case in particular for leather substrates.

Once the emulsion is deposited, the reaction between the polyisocyanate of the mixture and the compound bearing at least one function with a mobile hydrogen may take place at ambient temperature or in heat at a temperature which may be between 30° C. and 300° C., preferably between 40° C. and 250° C. and even more preferably between 50° C. and 150° C., preferably below 100° C. The temperature and crosslinking time are adapted according to the substrate. In the case of substrates sensitive to temperature, crosslinking catalysts will be used more particularly.

The coatings obtained, which comprise the mixture according to the present invention, have an increased degree of brilliance, and also a suitable drying time, which degree of brilliance and drying time are at least comparable with, or even better than, the coatings known in this field. The coatings comprising the mixture of the present invention have proved in particular to be more brilliant than similar coatings where the solvent used is a solvent of the ester type, in particular of the carbonate type.

The emulsion of the invention may also be used as an adhesive. In such a case, a coating is formed as described above, the coating here having adhesive properties, on a substrate intended to be adhesively secured to another element. The substrate may quite particularly be a substrate made of wood.

Examples will now be given by way of illustration without imparting any limitation to the invention which is defined by the claims appended to the present description.

The term "viscosity" employed in the present description, the examples which follow and the appended claims, is to be understood as dynamic viscosity. The measurement of viscosity is based on the principle of a cylinder rotating in the sample to be studied placed in a coaxial tank. The torque required to overcome the resistance offered by the product to the rotation of a cylinder is measured.

The equipment used is a Rheovisco 2 M apparatus of the company RHEO, equipped with a thermostatically controlled LAUDA bath and with an EIRELEC MT100 KC temperature probe.

The viscosity (in centipoise (cP) or in mPa·s) is read directly on the display screen. The accuracy of measurement is ±1.5% of the full scale value.

By way of example, the viscosity of a product at 200 cP is measured by means of the DIN 24 geometry at 60 r.p.m. At this speed, the full scale viscosity is 239.2 cP, or an accuracy of 239.2×1.5%=4 cP. The viscosity of a product at 4000 cP is measured by means of the DIN 14 geometry at 12 r.p.m. At this speed, the full scale viscosity is 6006.6 cP, or an accuracy of 6006.6×1.5%=90 cP.

EXAMPLES

Example 1

Dissolution of IPDI Isocyanurate (IPDT)

a) Standard Mode of Operation

The following standard mode of operation was used to effect the dissolution of solid (powder) IPDT (CAS RN: 53880-05-0) in the following different solvents:

Butyl acetate (comparative test)

Highsolv® P (Société Clariant) (comparative text)

Methoxy-n-butylacetate (according to the invention) CAS RN: 4435-53-4)

The whole of the solvent is fed in and heating is carried out at around 50° C. One third of the mass of IPDT is rapidly added. The temperature rate is raised to 90-130° C., according to the solvents, for example 90° C. for methoxy-n-butylacetate.

The remainder of the IPDT is then added and agitation is continued for 1 to 2 hours, according to the solvents.

b) Detailed Mode of Operation: Mixture of IPDT/Methoxy-n-Butylacetate 180 g of a mixture of IPDT/methoxy-n-butylacetate at 65% dry extract (i.e. 65% by weight of IPDT; 35% by weight of methoxy-n-butylacetate) are prepared, starting from 117 g of solid IPDT (Hüls Corporation; of Vestanate® T 1890/100 type; presentation in the form of granules having a diameter of less than 0.8 cm) and 63 g of methoxy-n-butylacetate solvent (Société Celanese).

The whole of the solvent (63 g) is placed in a 300 ml reactor previously cleaned with the reaction solvent and dried by flushing with nitrogen.

The reactor is then heated to 50° C. and around one third of the total amount (39 g) of solid IPDT is added while agitating mechanically.

After 15 minutes' agitation, the reactor is heated to 90° C., at which temperature the remainder of the solid IPDT (78 g) is added over 30 minutes while agitating.

Agitation is continued at a temperature of 90° C. for 1 hour. The mixture is then filtered while hot (mesh size 30 μm), at a temperature of around 40° C.

Example 2

Viscosity Test

With butyl acetate used as dissolvent of the IPDT according to the above mode of operation, a viscosity of less than 1000 mPa·s may be obtained. However, this solvent has a low flash point (22° C.) and an aggressive odour which is a nuisance for certain applications.

The use of Highsolv® with a higher flash point (59° C.) leads to a significant increase in the viscosity (1890 mPa·s at 25° C.).

On the other hand, the solutions of IPDT in methoxy-n-butylacetate (flash point: 62° C.) (Example 1.b) above), themselves impart to the mixture a low viscosity (760 mPa·s at 25° C.), even at a low temperature, while keeping the odour acceptable. Thus less than 7 000 mPa·s is measured at 5° C., at which temperature a solution in Highsolv® of the same titre of IPDT no longer flows.

Example 3

Test for Ease of Dissolving and Handling

Another advantage provided by solvents of the ether ester type, such as, for example, methoxy-n-butylacetate, is the ease of dissolution. Generally it is sufficient to heat the solvent/solid IPDT mixture at a temperature below 100° C., for example around 90° C., for around 2 hours in order to obtain a homogeneous mixture of stable viscosity. It is even possible to obtain the mixture by agitating at ambient temperature for one night.

In order to produce the same mixture with Highsolv® P it is necessary to heat beyond 90° C., thus modifying both the viscosity and the colour of the solution.

In addition, when they are exposed to temperatures below 15° C., the solutions in Highsolv® P become difficult to pump (viscosity>10000 mPa·s). The mixture of IPDT/methoxy-n-butylacetate (65% and 35% by weight respectively) reaches this limit only towards 0° C.

Example 4

Preparation of a Self-Emulsifiable Composition

Into a 300 ml reactor, previously cleaned with the reaction solvent and dried by flushing with nitrogen, are placed 143 g of hexamethylene diisocyanate isocyanurate (HDT with theoretical NCO titre 22.0±0.5; Company Rhodia).

While agitating, 94.2 g of mixture obtained at example 1.b) are fed in, then 4.4 g of dimethylcyclohexylamine (DMCHA).

There are then added, by means of a "push syringe", over 30 to 45 minutes, while continuing agitation, 13.8 g of non-reactive hydrophilic additive of the ethoxylated phosphate ester type (Rhodafac® range, supplier: Rhodia), characterized by a hydrophobic head at $C_{13}$, an average ethoxylated chain length of 7 ethylene oxide units and an average acidity value of 185 mg KOH/g.

During this stage, the temperature of the reactor is kept below 50° C. by cooling.

90 mg (or around 280 ppm) of an antioxidant stabilizer (Irganox® 1135; supplier: Ciba) diluted with methoxy-n-butylacetate (1:1) are then added.

The whole is diluted with the remainder of the methoxy-n-butylacetate (total charge: 64.6 g), then homogenized for 1 hour. The self-emulsifiable mixture is then filtered and kept under nitrogen.

The self-emulsifiable mixture has the following characteristics:
Coloration (APHA): <100
NCO titre: 12.2±1%
Dry extract: 68±3%
Viscosity (25° C.): 200±100 mPa·s
(HDI+IPDI): <0.5%
HDI: <0.5%
IPDI: <0.5%.

Example 5

Preparation of a Self-Emulsifiable Composition 80.2 g of the following mixture are prepared as described in Example 4:

| Compound | Weight (g) |
| --- | --- |
| HDI trimer (HDT) | 44.0 g |
| IPDI trimer (IPDT) at 65% in methoxy-n-butylacetate | 29.0 g |
| Ethoxylated phosphate ester described in example 4 (Rhodafac ®) | 5.9 g |
| Dimethylcyclohexylamine (DMCHA) | 1.3 g |

Examples 6 to 10

Examples of Application to Wood (Tests

This mixture is then added to various solvents, in the amounts indicated (in grams) in the following table, in order to obtain the compositions described as part B (compositions B1 to B4) of the formulations of examples 6 to 9 respectively:

|  |  | Part B | | | |
| --- | --- | --- | --- | --- | --- |
|  |  | B1 | B2 | B3 | B4 |
| Solvent added (g) | Methoxybutyl acetate (Celanese) |  | 19.8 |  | 9.7 |
|  | Highsolv ® P (Clariant) |  |  | 19.8 |  |
|  | Propylene glycol diacetate (Dow) | 19.8 |  |  |  |
|  | Rhodiasolv ™ RPDE (Rhodia) |  |  |  | 9.7 |

In addition there is used, as part B5 (by way of comparative example), Rhodocoat® X EZ-D 401 (Company Rhodia), a self-emulsifiable mixture based on IPDT and hydrophilic additive, in butyl acetate.

The compositions B1 to B5 are then mixed manually with a part A (reference Flow® gloss of BONA), commercial, intended for the application of coatings to parquet.

The ratio used is 10 parts of A to one part of each of the B parts (B1 to B5).

The formulations A+B are then applied to glass plate and the following measurements are carried out:
Duration of Incorporation
The time required (expressed in minutes) to obtain a homogeneous mixture of A+B is measured.
Drying Time
T1 is characterized by the "dust-dry" drying time. After application of the film, T1 corresponds to the time (expressed in minutes) starting from which small balls of glass may be removed by light brushing without damaging the surface.
Determination of Return to Hardness
This technique consists in following the development of the Persoz hardness of a film of varnish or paint during drying (after 1 day (D1), three days (D3) and seven days (D7)) by means of a type 300 Erichsen test pendulum. The principle of the Persoz hardness pendulum is based on the fact that the oscillations of a pendulum placed on a sample are damped more, the softer the layer of varnish. It consists in measuring the hardness of a film by the damping of the oscillations of a pendulum from 12° to 4° which rests on the film by means of two steel balls of the same diameter. The results are expressed in seconds. The more or less rapid development of the Persoz hardness over time makes it possible to follow the construction of the network.
Brilliance
The brilliance of a coating is one of the most usefully measurable properties. The principle is to direct a luminous beam, at an angle of 20°, 60° or 85°, onto the surface to be examined. The rays reflected are collected by a photoelectric cell. By means of a galvanometer, the apparatus gives a value from 0 to 100 proportional to the brilliance. A ceramic standard serves as reference and represents the maximum value. The brilliance is expressed in % (or unit of brilliance).

| Example No. | Part B | Incorporation Duration | Drying time T1 (min.) | Persoz hardness D1 | D3 | D7 | Brilliance at 20° |
|---|---|---|---|---|---|---|---|
| Example 6 | B1 | 1 min. 20 sec. | 32 | 155 | 197 | 191 | 85.4 |
| Example 7 | B2 | 1 min. 20 sec. | 16 | 196 | 224 | 215 | 86.3 |
| Example 8 | B3 | 40 sec. | 25 | 191 | 221 | 202 | 87.5 |
| Example 9 | B4 | 2 min. | 23 | 173 | 209 | 210 | 86.3 |
| Example 10 (comparative) | B5 | 2 min. 45 sec. | 21 | 192 | 222 | 195 | 79.3 |

The formulations based on the use of IPDT prepared in a solvent including an ester function and an ether function, such as methoxybutyl acetate, have shorter mixing times, in comparison with a composition of IPDT in butyl acetate (comparative example 10). In addition, the brilliance obtained is also greater, the sign of a better compatibility of parts A and B.

Example 7 in particular exhibits a good compromise between dust-dry drying time, brilliance and development of hardness.

Examples 11 and 12

Examples of Application on Metal

One part A is produced according to the following composition:

| Component | Quantity (g) | Function | Manufacturer |
|---|---|---|---|
| Setalux 6511AQ47 | 272.8 | Polyalcohol resin | Nuplex |
| Setalux 6520AQ45 | 284.6 | Polyalcohol resin | Nuplex |
| Butyl glycol | 10.8 | Coalescence agent | |
| Dehydran 1293 | 1.8 | Antifoam | Cognis |
| Surfynol 104DPM | 11.5 | Antifoam | Air products |
| BYK301 | 1.2 | Dispersion agent | BYK |
| BYK348 | 1.2 | Wetting agent | BYK |
| Tafigel PUR60 (25% in BG) | 4.7 | Thickener | Münzig chemie |
| H₂O | 13.7 | | |
| DBTL (1% in Solvesso100) | 5.5 | Catalyst | Fluka |
| H₂O | 76.2 | | |
| Total quantity (g): | 684.0 | | |

The B parts used are as follows:

| Example No. | Composition | Quantity of part B (g) to 684 g of part A |
|---|---|---|
| Example 11 | Part B2 (example 7) | 272.08 |
| Example 12 | Rhodocoat X EZ-D 401 | 221.06 |
| | Methoxypropyl acetate | 21 |
| | Xylene | 21 |
| | Butylglycol acetate | 5 |

The mixture A+B is then produced with manual agitation and the viscosity of the formulation is adjusted, by the addition of water, to a viscosity of 22 s. measured by DIN 4 cup at 23° C. The pot life of the formulation is then measured.

The measurement of the brilliance and of the Haze over time is used to evaluate this pot life.

| | Duration | | | | | |
|---|---|---|---|---|---|---|
| | Initial | 1 hr | 2 hrs | 3 hrs | 4 hrs | 5 hrs |
| Brilliance 20° | | | | | | |
| Example 11 | 97 | 96 | 97 | 97 | 95 | 94 |
| Example 12 | 96 | 93 | 93 | 92 | 92 | 91 |
| Haze | | | | | | |
| Example 11 | 24 | 28 | 32 | 43 | 57 | 61 |
| Example 12 | 37 | 41 | 43 | 55 | 71 | 75 |

The level of brilliance and of Haze are excellent for both formulations in the initial state.

However, for Example 11 based on the mixture according to the invention, a more moderate reduction in brilliance and increase in the Haze are noted, thereby indicating an improved stability of the composition.

The mechanical properties of the coating are also measured after application to a metal plate and drying in controlled conditions (23° C., 50% relative humidity) for 7 days.

Falling Ball Test for Resistance to Impact

This involves evaluating the impact-resistance of a film of paint or varnish on a steel plate by observing the appearance of crazing or peeling.

The test consists in subjecting the coating to the impact of a striking pin of specific dimensions and weight, the drop height of which is adjustable. The maximum height at which the film of paint is no longer damaged by the impact is thus determined.

Two (Erichsen) falling ball test apparatuses are available, one equipped for AFNOR impacts (weight of 1000 g) and the other for ASTM impacts (weight of 910.3 g).

The result given indicates the maximum height obtained before the appearance of crazing:

| Impact resistance | Example 11 | Example 12 |
|---|---|---|
| ASTM | 30 | 18 |
| AFNOR | 20 | 15 |

The coatings based on the mixture according to the invention have a greater flexibility in relation to the comparative example.

Examples 13 and 14

Examples of Application to Plastics Material

A part A of the following composition is produced:

|  | Quantity | Function | Manufacturer |
|---|---|---|---|
| Neorez R 1010 | 70.2 g | PUD resin | Neoresins |
| Dehydran 1293 | 0.2 g | Antifoam | Cognis |
| BYK346 | 0.4 g | Wetting agent | BYK |
| Demineralized water | 18.6 g |  |  |
| Aquachem 895-9905 ALB lamp black | 3.6 g | Pigment paste | Degussa |

The mixture of A+B2 (according to the invention) on the one hand and A+B5 (comparative) on the other hand is carried out with manual agitation in the following proportions:

| Example No. | Composition | Quantity of part B (g) to 100 g of part A |
|---|---|---|
| Example 13 | B2 | 10 |
| Example 14 | B5 | 10 |

The chemical resistance in relation to numerous aggressive agents is evaluated. The film is exposed to cotton soaked with various aggressive agents. After a certain time, visual assessment of the film is carried out, giving 0 to 5 or 6 according to the aggressive agents (0=film intact, 5 or 6=film destroyed).

| CHEMICAL RESISTANCE | | Part A only | Example 13 | Example 14 |
|---|---|---|---|---|
| Resistance to | For 1 hr at 23° C. | | | |
| chemical agents | Isopropanol | 2 | 2 | 2 |
| (0 to 5) | Water | 5 | 1 | 2 |
|  | 50% ethanol | 5 | 2 | 1 |
|  | 10% acetic acid | 4 | 1 | 1 |
|  | 10% sulphuric acid | 2 | 2 | 2 |
|  | 10% ammonium hydroxide | 1 | 1 | 2 |
| Resistance to | For 24 hrs at 70° C. | | | |
| transpiration (0 to 5) | Acid transpiration | 5 | 2 | 5 |
|  | Alkaline transpiration | 4 | 2 | 2 |
|  | NaCl transpiration | 0 | 0 | 0 |
|  | Neutral transpiration | 3 | 0 | 1 |
| Resistance to sun | For 1 hr | | | |
| cream and insecticide | Sun lotion at 23° C. | 6 | 2 | 2 |
| (DEET) (0 to 6) | DEET at 23° C. | 6 | 2 | 1 |
|  | Sun lotion at 74° C. | 6 | 3 | 6 |
|  | DEET at 74° C. | 2 | 2 | 3 |

Example 13 shows a resistance to chemical attack greater for the coating comprising the mixture according to the invention.

The present invention, therefore, is well adapted to carry out the objects and attain the ends and advantages mentioned, as well as others inherent therein. While the invention has been depicted and described and is defined by reference to particular preferred embodiments of the invention, such references do not imply a limitation on the invention, and no such limitation is to be inferred. The invention is capable of considerable modification, alteration and equivalents in form and function, as will occur to those ordinarily skilled in the pertinent arts. The depicted and described preferred embodiments of the invention are exemplary only and are not exhaustive of the scope of the invention. Consequently, the invention is intended to be limited only by the spirit and scope of the appended claims, giving full cognizance to equivalents in all respects.

The invention claimed is:

1. A mixture based on polyisocyanate, characterized in that it comprises:
    at least one isocyanurate polyisocyanate obtained from cycloaliphatic diisocyanates;
    at least one solvent comprising an ester function and an ether function; and
    a non-reactive hydrophilic additive;
    wherein the non-reactive hydrophilic additive corresponds to formula (1) or formula (2):

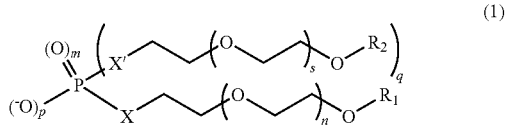

(1)

with, when q is equal to zero, those of formula (2):

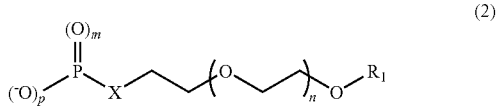

(2)

additives of formula (1) or formula (2) where:
    p represents zero or an integer between 1 and 2 (closed intervals, i.e. including the bounds);

m represents zero or an integer between 1 and 2 (closed intervals, i.e. including the bounds);

the sum p+m+q is at most equal to three;

the sum 1+p+2m+q is equal to three or five;

X and X', individually, represent an arm having at least two carbon groups;

n and s, individually, represent an integer selected between 5 and 30; and $R_1$ and $R_2$, identical or different, represent a hydrocarbon radical optionally substituted by a halogen atom.

2. The mixture according to claim 1, having a viscosity at 5° C. below 10000 mPa·s.

3. The mixture according to claim 1 or claim 2, wherein the solvent has a flash point above 61° C.

4. The mixture according to claim 1, wherein the solvent has a boiling point between 50° C. and 350° C.

5. The mixture according to claim 1, wherein the solvent is 3-methoxy-n-butylacetate.

6. The mixture according to claim 1, wherein the proportion of solvent in the mixture is between 2% and 60% by mass of solvent in relation to the whole of the mixture.

7. The mixture according to claim 1, wherein the cycloaliphatic polyisocyanate is selected from the group consisting of isophorone diisocyanate, bis-isocyanatomethylnorboranen perhydro-2,4'- or 4,4'-diphenylmethane diisocyanate, and bis-isocyanatomethylcyclohexane.

8. The mixture according to claim 1, wherein the isocyanurate polyisocyanate is obtained by catalytic (cyclo)trimerization of cycloaliphatic diisocyanates.

9. The mixture according to claim 1, comprising:
the non-reactive hydrophilic additive;
3-methoxy-n-butylacetate; and
isophorone diisocyanate isocyanurate (IPDT);
in proportions of 20% to 50% by weight of 3-methoxy-n-butylacetate in relation to the total mass of mixture.

10. An aqueous emulsion comprising a mixture according to claim 1.

11. The aqueous emulsion according to claim 10, characterized in that it is obtained by emulsification in water of said mixture, characterized in that said emulsion comprises in addition at least one compound bearing at least one function with a mobile hydrogen selected from primary or secondary hydroxyl functions, phenol functions, primary and/or secondary amino functions, carboxylic functions and thiol functions.

12. The aqueous emulsion according to claim 10, characterized in that it is obtained by emulsification in water of said mixture, characterized in that said emulsion comprises in addition at least one aqueous dispersion of polyurethane.

13. The aqueous emulsion according to claim 10, characterized in that it is obtained by emulsification in water of said mixture, characterized in that said emulsion comprises in addition at least one aqueous dispersion of polyurethane and at least one compound bearing at least one function with a mobile hydrogen selected from primary or secondary hydroxyl functions, phenol functions, primary and/or secondary amino functions, carboxylic functions and thiol functions.

14. The mixture according to claim 1 further comprising one or more isocyanurates obtained from aliphatic polyisocyanates.

15. The mixture according to claim 1 further comprising one or more isocyanurates obtained from hexamethylene diisocyanate.

* * * * *